United States Patent
Pan et al.

(10) Patent No.: US 10,622,671 B2
(45) Date of Patent: Apr. 14, 2020

(54) HYBRID ELECTROLYTES WITH CONTROLLED NETWORK STRUCTURES FOR LITHIUM METAL BATTERIES

(71) Applicants: Qiwei Pan, Philadelphia, PA (US); Christopher Li, Bala Cynwyd, PA (US)

(72) Inventors: Qiwei Pan, Philadelphia, PA (US); Christopher Li, Bala Cynwyd, PA (US)

(73) Assignee: Drexel University, Philadelphia, PA (US)

( * ) Notice: Subject to any disclaimer, the term of this patent is extended or adjusted under 35 U.S.C. 154(b) by 103 days.

(21) Appl. No.: 15/750,700

(22) PCT Filed: Aug. 5, 2016

(86) PCT No.: PCT/US2016/045830
§ 371 (c)(1),
(2) Date: Feb. 6, 2018

(87) PCT Pub. No.: WO2017/030811
PCT Pub. Date: Feb. 23, 2017

(65) Prior Publication Data
US 2018/0226679 A1   Aug. 9, 2018

Related U.S. Application Data

(60) Provisional application No. 62/216,519, filed on Sep. 10, 2015, provisional application No. 62/207,176, filed on Aug. 19, 2015.

(51) Int. Cl.
*H01M 10/052* (2010.01)
*H01M 10/0525* (2010.01)
(Continued)

(52) U.S. Cl.
CPC ....... *H01M 10/0525* (2013.01); *H01M 4/364* (2013.01); *H01M 4/583* (2013.01);
(Continued)

(58) Field of Classification Search
CPC .......... H01M 10/052; H01M 10/0525; H01M 10/054; H01M 10/0565; H01M 4/364; H01M 4/583; H01M 2220/20
(Continued)

(56) References Cited

U.S. PATENT DOCUMENTS 7,790,803 B2 * 9/2010 Liu ................. B01D 53/228
525/54.3
9,680,181 B2 * 6/2017 Rhee ................... C08L 71/02
(Continued)

FOREIGN PATENT DOCUMENTS

KR   1020110027486 B1 *  4/2013  ............ C08L 101/12

OTHER PUBLICATIONS

Machine translation of KR1020110027486B1(no date).*
(Continued)

*Primary Examiner* — Amanda C. Walke
(74) *Attorney, Agent, or Firm* — Mendelsohn Dunleavy, P.C.

(57) ABSTRACT

Solid polymer electrolytes (SPEs) with tunable network structures are prepared by a facile one-pot reaction of polyhedral oligomeric silsesquioxane (POSS) and poly(ethylene glycol) (PEG). These SPEs with high conductivity and high modulus exhibit superior lithium dendrite growth resistance even at high current densities. Measurements of lithium metal batteries with a LiFePO4 cathode show excellent cycling stability and rate capability. Also disclosed are products made by the process of the invention and batteries including such products.

20 Claims, 10 Drawing Sheets

(51) Int. Cl.
H01M 10/0565 (2010.01)
H01M 10/054 (2010.01)
H01M 4/36 (2006.01)
H01M 4/583 (2010.01)

(52) U.S. Cl.
CPC ....... *H01M 10/052* (2013.01); *H01M 10/054* (2013.01); *H01M 10/0565* (2013.01); *H01M 2220/20* (2013.01)

(58) Field of Classification Search
USPC .................................................. 429/231.95
See application file for complete search history.

(56) References Cited

U.S. PATENT DOCUMENTS

2016/0097306 A1* 4/2016 Neukirchner ........... F01L 1/267
123/90.27
2017/0133717 A1* 5/2017 Makino .................... H01B 1/06

OTHER PUBLICATIONS

Li et al, "Study on Properties of Gel Polymer Electrolytes Based on Ionic Liquid and Amine-Terminated Butadiene-Acrylonitrile Copolymer Chemically Crosslinked by Polyhedral Oligomeric Silsesquioxane", Journal of Applied Polymer Science, vol. 126, 273-279. (Year: 2012).*
Pan et al, "Hybrid Electrolytes with Controlled Network Structures for Lithium Metal Batteries", Advanced Materials, 27, 5995-6001. (Year: 2015).*
Grande, Lorenzo, et al. "The lithium/air battery: still an emerging system or a practical reality?." Advanced materials 27.5 (2015): 784-800.
Zu, Chen-Xi, and Hong Li. "Thermodynamic analysis on energy densities of batteries." Energy & Environmental Science 4.8 (2011): 2614-2624.
Bruce, Peter G., et al. "Li—O2 and Li—S Batteries with High Energy Storage." Nature Materials, vol. 11, No. 02, p. 172.
Jacoby, Mitch. "Assessing the safety of lithium-ion batteries." Chem. Eng. News 91 (2013): 33-37.
Rosso, et al. "Dendrite Short-Circuit and Fuse Effect on Li/Polymer/Li Cells." Electrochimica Acta, vol. 51, No. 25, 2006, pp. 5334-5340.
Katherine J. Harry, et al. "Detection of Subsurface Structures underneath Dendrites Formed on Cycled Lithium Metal Electrodes." Nature Materials, vol. 13, No. 1, 2013, pp. 69-73.
Chazalviel, J. "Electrochemical Aspects of the Generation of Ramified Metallic Electrodeposits." Physical Review A, vol. 42, No. 12, 1990, pp. 7355-7367.
Monroe, Charles, and John Newman. "The impact of elastic deformation on deposition kinetics at lithium/polymer interfaces." Journal of the Electrochemical Society 152.2 (2005): A396-A404.
Mogi, Ryo K, et al. "Effects of Some Organic Additives on Lithium Deposition in Propylene Carbonate." Journal of the Electrochemical Society, vol. 149, No. 12, 2002, pp. A1578-A1583.
Lu, Yingying, et al. "Stable Lithium Electrodeposition in Liquid and Nanoporous Solid Electrolytes." Nature Materials, vol. 13, No. 10, Oct. 2014, pp. 961-969.
Lu, Yingying, et al. "Ionic-Liquid-Nanoparticle Hybrid Electrolytes: Applications in Lithium Metal Batteries." Angewandte Chemie International Edition, vol. 53, No. 2, 2014, pp. 488-492.
Lu, Yingying, et al. "Ionic Liquid-Nanoparticle Hybrid Electrolytes and Their Application in Secondary Lithium-Metal Batteries." Advanced Materials, vol. 24, No. 32, 2012, pp. 4430-4435.
Lu, et al. "Stable Lithium Electrodeposition in Salt-Reinforced Electrolytes." Journal of Power Sources, vol. 279, 2015, pp. 413-418.

Zhang, Jinshui, et al. "Superior Conductive Solid-like Electrolytes: Nanoconfining Liquids within the Hollow Structures." Nano Letters, vol. 15, No. 5, 2015, pp. 3398-3402.
Ishikawa, Masashi, et al. "In Situ Scanning Vibrating Electrode Technique for the Characterization of Interface between Lithium Electrode and Electrolytes Containing Additives." Journal of the Electrochemical Society, vol. 141, No. 12, 1994, pp. L159-L161.
Gurevitch, Inna A, et al. "Nanocomposites of Titanium Dioxide and Polystyrene-Poly(Ethylene Oxide) Block Copolymer as Solid-State Electrolytes for Lithium Metal Batteries." Journal of the Electrochemical Society, vol. 160, No. 9, 2013, pp. A1611-A1617.
Liu, S., et al. "Effect of Nano-Silica Filler in Polymer Electrolyte on Li Dendrite Formation in Li/Poly(Ethylene Oxide)-Li(CF3SO2)2N/Li." Journal of Power Sources, vol. 195, No. 19, 2010, pp. 6847-6853.
Khurana, Rachna, et al. "Suppression of lithium dendrite growth using cross-linked polyethylene/poly (ethylene oxide) electrolytes: A new approach for practical lithium-metal polymer batteries." Journal of the American Chemical Society 136.20 (2014): 7395-7402.
Bouchet, Renaud, et al. "Single-ion BAB triblock copolymers as highly efficient electrolytes for lithium-metal batteries." Nature materials 12.5 (2013): 452-457.
Stone, G. M., et al. "Resolution of the modulus versus adhesion dilemma in solid polymer electrolytes for rechargeable lithium metal batteries." Journal of the Electrochemical Society 159.3 (2012): A222-A227.
Liu, S., et al. "Effect of co-doping nano-silica filler and N-methyl-N-propylpiperidinium bis (trifluoromethanesulfonyl) imide into polymer electrolyte on Li dendrite formation in Li/poly (ethylene oxide)-Li (CF 3 SO 2) 2 N/Li." Journal of Power Sources 196.18 (2011): 7681-7686.
Blonsky, Peter M., et al. "Polyphosphazene solid electrolytes." Journal of the American Chemical Society 106.22 (1984): 6854-6855.
Croce, F., et al. "Nanocomposite polymer electrolytes for lithium batteries." Nature 394.6692 (1998): 456.
Croce, F., S. Sacchetti, and B. Scrosati. "Advanced, lithium batteries based on high-performance composite polymer electrolytes." Journal of Power Sources 162.1 (2006): 685-689.
Damen, Libero, et al. "Solid-state, rechargeable Li/LiFePO4 polymer battery for electric vehicle application." Journal of Power Sources 195.19 (2010): 6902-6904.
Liu, Wei, et al. "Ionic conductivity enhancement of polymer electrolytes with ceramic nanowire fillers." Nano letters 15.4 (2015): 2740-2745.
Lu, Yingying, et al. "Stable cycling of lithium metal batteries using high transference number electrolytes." Advanced Energy Materials 5.9 (2015).
Lu, Qingwen, et al. "Advanced semi-interpenetrating polymer network gel electrolyte for rechargeable lithium batteries." Electrochimica Acta 152 (2015): 489-495.
Nugent, Jennifer L., Surya S. Moganty, and Lynden A. Archer. "Nanoscale organic hybrid electrolytes." Advanced Materials 22.33 (2010): 3677-3680.
Schulze, Morgan W., et al. "High-modulus, high-conductivity nanostructured polymer electrolyte membranes via polymerization-induced phase separation." Nano letters 14.1 (2013): 122-126.
Smith, Derrick M., et al. "Polymer electrolyte membranes with exceptional conductivity anisotropy via holographic polymerization." Journal of Power Sources 271 (2014): 597-603.
Smith, Derrick M., et al. "Tuning ion conducting pathways using holographic polymerization." Nano letters 12.1 (2011): 310-314.
Sun, Xiao-Guang, Craig L. Reeder, and John B. Kerr. "Synthesis and characterization of network type single ion conductors." Macromolecules 37.6 (2004): 2219-2227.
Tu, Zhengyuan, et al. "Nanoporous polymer-ceramic composite electrolytes for lithium metal batteries." Advanced Energy Materials 4.2 (2014).
Villaluenga, Irune, et al. "Nanoparticle-driven assembly of highly conducting hybrid block copolymer electrolytes." Macromolecules 48.2 (2015): 358-364.

(56) References Cited

OTHER PUBLICATIONS

Walker, Catherine N., et al. "Tunable networks from thiolene chemistry for lithium ion conduction." ACS Macro Letters 1.6 (2012): 737-741.

Wang, Lishi, Xingwang Li, and Wensheng Yang. "Enhancement of electrochemical properties of hot-pressed poly (ethylene oxide)-based nanocomposite polymer electrolyte films for all-solid-state lithium polymer batteries." Electrochimica Acta 55.6 (2010): 1895-1899.

Watanabe, Masayoshi, et al. "Ionic conductivity of network polymers from poly (ethylene oxide) containing lithium perchlorate." Polymer journal 18.11 (1986): 809.

Zhang, Hanjun, Sunil Kulkarni, and Stephanie L. Wunder. "Polyethylene glycol functionalized polyoctahedral silsesquioxanes as electrolytes for lithium batteries." Journal of the Electrochemical Society 153.2 (2006): A239-A248.

Zhang, Zhengcheng, et al. "Cross-linked network polymer electrolytes based on a polysiloxane backbone with oligo (oxyethylene) side chains: synthesis and conductivity." Macromolecules 36.24 (2003): 9176-9180.

* cited by examiner

HYBRID ELECTROLYTES WITH CONTROLLED NETWORK STRUCTURES FOR LITHIUM METAL BATTERIES

STATEMENT OF GOVERNMENT INTEREST

This invention was made with government support under Grant No. NSF CMMI-1334067 awarded by the National Science Foundation. The government has certain rights in this invention.

BACKGROUND OF THE INVENTION

The invention relates to hybrid electrolytes having network structures suitable for use in lithium metal batteries.

Solid polymer electrolytes (SPEs) with high conductivity and excellent resistance to lithium dendrite growth are highly desirable for the safe operation of lithium batteries. We herein report the facile one-pot synthesis of nanoparticle-containing cross-linked SPEs based on polyhedral oligomeric silsesquioxanes (POSS) and amine-terminated poly (ethylene glycol) (PEG). Conductivity, mechanical properties, and resistance to dendrite growth of the electrolytes can be tuned by controlling the network structures. Our hybrid SPEs exhibit superior dendrite inhibition even at high current densities. The all-solid-state lithium metal batteries fabricated using our SPEs show excellent cycling stability and rate capability. This hybrid material could significantly improve the performance and safety of lithium batteries. A new class of hybrid electrolytes based on POSS nanoparticles with controlled network structures have been designed and prepared using a facile one-pot reaction. Properties of the SPEs including conductivity, mechanical properties and resistance to lithium dendrites growth can be tuned by changing the cross-linked structures. SPEs with high room temperature ion conductivity (≈0.1 mS/cm) or with high ionic conductivity (>1 mS/cm) combined with high storage modulus (33.6 MPa) at 105° C. have been obtained. The latter one shows superior resistance to lithium dendrites growth compared with reported SPE systems, even under high current densities of 0.5 mA/cm2 and 1.0 mA/cm2. Li/LiFePO4 batteries using POSS-2PEG6K as electrolyte show improved cycling stability and rate capability. The hybrid SPEs therefore are promising for fabricating next generation safe lithium batteries.

Secondary batteries are highly desirable nowadays due to declining fossil resources, increasing demands for clean energy, and rapid expansion of the electronics market. Although the current state-of-the-art lithium ion batteries (LIBs) have been widely used in consumer electronics, because of their relatively low energy density, they cannot meet the needs of applications such as electrical vehicles, autonomous aircrafts, etc. To enhance the energy density, one effective way is to replace graphite (372 mAhg$^{-1}$) with lithium metal (3860 mAhg$^{-1}$) as the anode to fabricate a lithium metal battery (LMB).[1] Furthermore, lithium metal can act as the lithium source of the batteries, which enables the use of un-lithiated materials, such as sulfur or air, as the cathodes to fabricate lithium/sulfur or lithium/air batteries with improved energy density.[2, 3] To materialize LMB, the biggest obstacle is the associated safety issues, induced by the uneven deposition of lithium on the lithium metal anode during the charging process. After repeated charge-discharge cycles, this uneven deposition leads to the formation of lithium dendrites, which can connect the two electrodes and short-circuit the cell, causing fire or explosions in some severe cases.[4] Although the growth of the lithium dendrites has been observed using optical microscopy,[5, 6] scanning electron microscopy[7] and hard X-ray microtomography[8], the detailed mechanism of the dendrite formation is still under active research. Chazalviel et al. argued that the anion depletion near the lithium electrode could lead to large electric fields, which in turn, causes dendrites to grow.[9] This model suggests that to prevent anion depletion, electrolytes with high ionic conductivity and low anion mobility are preferred. Alternatively, Monroe and Newman studied interfacial stability in lithium/solid polymer electrolytes (SPEs) systems and proposed that interfacial roughening could be mechanically suppressed if the shear modulus of the separator is about twice that of lithium metal.[10] Following these two frameworks, numerous approaches have been reported in order to achieve LMBs with suppressed lithium dendrite formation. These include tuning the solid electrolyte interface (SEI) with judiciously selected additives,[11-13] using hybrid liquid electrolytes,[14-16] forming alloys of lithium and other metals during electrodeposition,[17, 18] and employing sophisticated SPEs.[19-25] However, despite those extensive efforts, the inhibition of lithium dendrite growth in high current densities (>0.5 mA/cm$^2$) still remains a challenging task, and is considered as a roadblock for LMBs to reach the market place.

Among all the methods mentioned above, SPEs are of particular interest because in addition to their improved dendrite resistance, SPEs also avoid the presence of flammable organic solvents and therefore directly leads to safer all-solid-state batteries. Poly(ethylene oxide) (PEO), which has strong lithium ion solvating ability and high dielectric constant, has been extensively used for SPE systems. Mainly five types of PEO-containing SPEs show promising properties, including cross-linked networks,[22] nanoparticle-containing hybrid SPEs,[26] block/grafted copolymers,[19-21] and SPEs via polymerization-induced phase separation[27] and holographic polymerization.[28, 29] To date, cross-linked SPEs based on polyethylene,[22] polyurethane,[30] polysiloxane,[31, 32] polyacrylate,[33] and polyphosphazene,[34] have been reported. In particular, Khurana et al. recently reported an elegant cross-linked polyethylene/PEO SPE with excellent lithium dendrite growth resistance ($C_d$ value of 1790 C/cm$^2$ for the lithium symmetric cell at a current density of 0.26 mA/cm$^2$).[22] For PEO-based hybrid SPEs, nanoparticles, such as TiO$_2$,[19] SiO$_2$,[23, 24] Al$_2$O$_3$,[35] and ZrO$_2$,[36] have been introduced to PEO homopolymers or block copolymers to obtain enhanced conductivity and resistance to the growth of lithium dendrites.

SUMMARY OF THE INVENTION

Figure 1A:
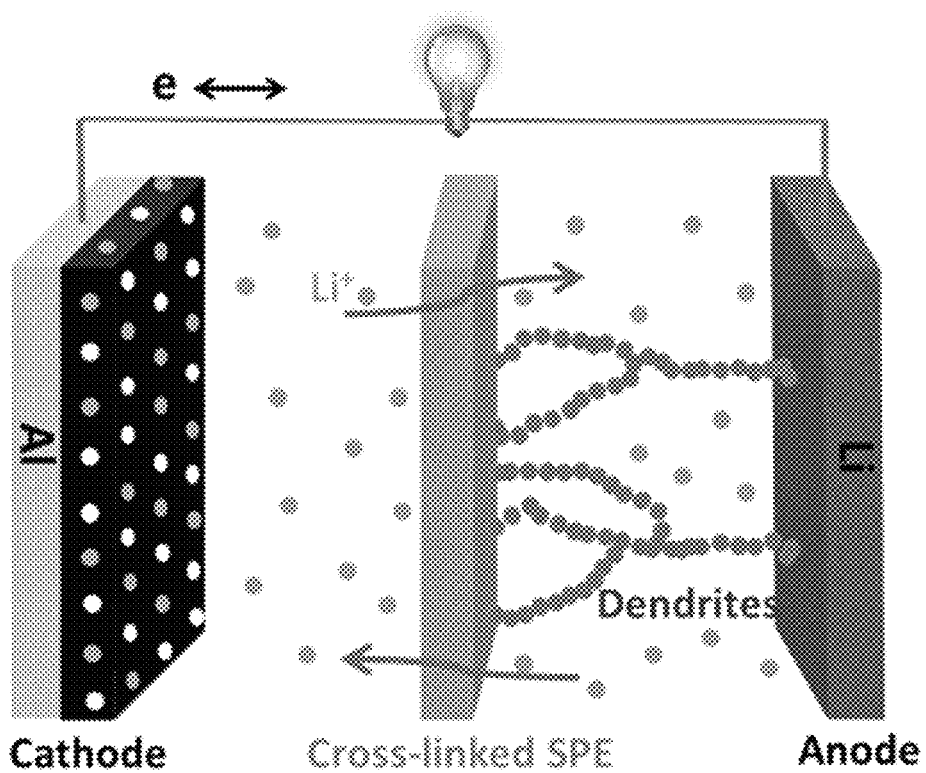
FIG. 1A is a schematic of lithium metal battery (LMB) configuration with cross-linked polyhedral oligomeric silsesquioxane (POSS)-poly(ethylene glycol) (PEG) solid polymer electrolyte (SPE) as a separator to block the growth of lithium dendrites.

In one aspect, the present invention relates to a process for making lithium or sodium solid polymer electrolytes comprising a step of reacting an inorganic polyhedral oligomeric silsesquioxane with a functionalized poly(ethylene glycol) that is amine-terminated or hydroxyl terminated in the presence of a lithium or sodium salt or mixture of lithium and sodium salts.

The invention also relates to a product made by the process of the invention and to a battery comprising the product of the invention.

DETAILED DESCRIPTION OF THE INVENTION

The following definitions of terms are provided in order to clarify the meanings of certain terms as used herein.

It must be noted that as used herein and in the appended claims, the singular forms "a", "an", and "the" include plural references unless the context clearly dictates otherwise. Furthermore, the terms "a" (or "an"), "one or more," and "at least one" can be used interchangeably herein. The terms "comprising," "including," "having," and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

Inspired by the aforementioned works, herein we report a new class of cross-linked SPEs with inorganic polyhedral oligomeric silsesquioxane (POSS) as the cross-linker and poly(ethylene glycol) (PEG) as the lithium ion solvating polymer. The hybrid SPEs are synthesized using a facile one-pot reaction to inhibit the lithium dendrites growth in the LMBs (FIG. 1A). POSS provides the much needed mechanical strength for a mechanically strong SPE while its small particle size ensures a uniform SPE. In addition, its well defined surface chemistry allows one to easily tune the SPE network architecture. In this paper we show that the POSS network-based SPEs exhibit excellent conductivity, mechanical properties, lithium dendrite growth resistance, and improved cycling stability and rate capability in all-solid-state LMBs.

Figure 1B:
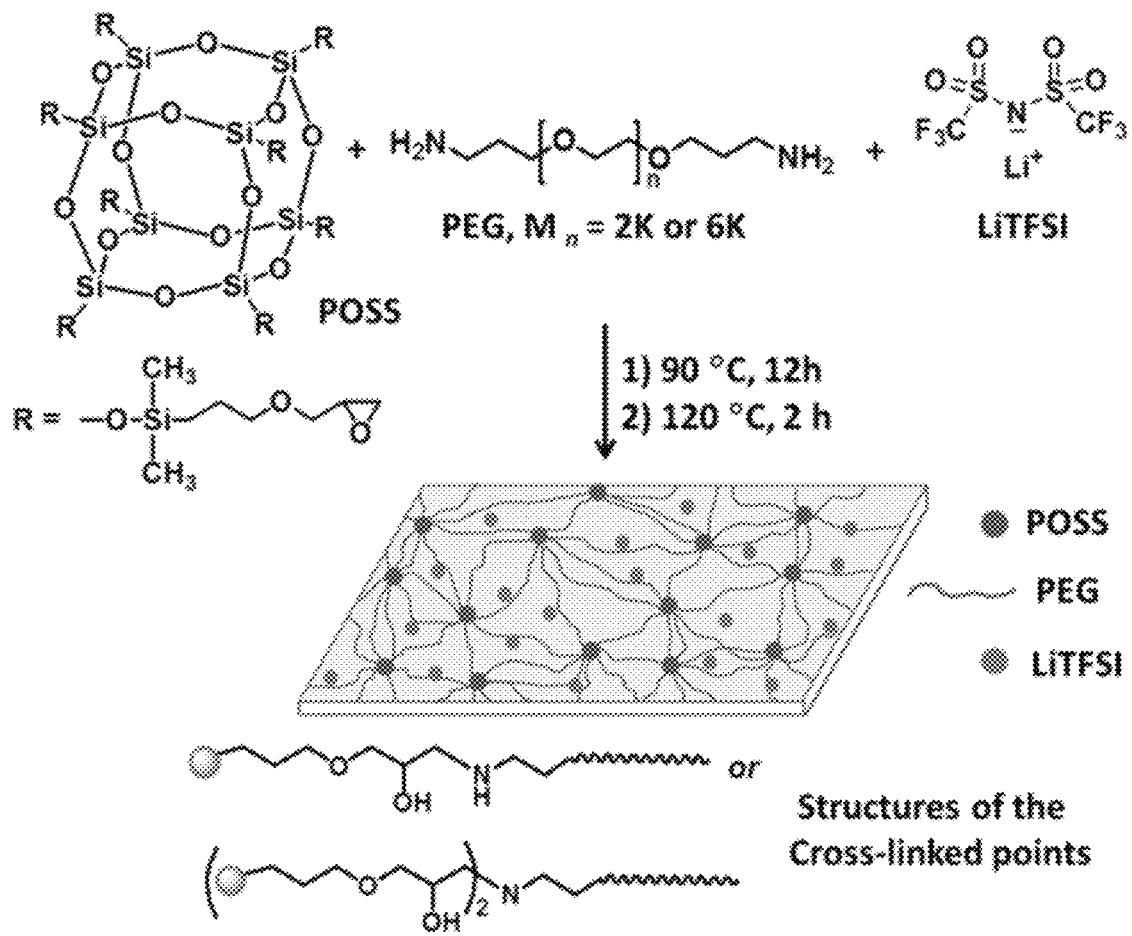
FIG. 1B illustrates the synthesis of the POSS-PEG cross-linked SPEs (EO/Li$^+$=16) and the ideal structures of the networks are shown in FIG. 1C.

Different from most of the reported cross-linked SPEs prepared using complicated procedures,[22, 31-34] the hybrid SPEs can be easily prepared by a one-pot reaction of octakis(3-glycidyloxypropyldimethylsiloxy)octasilsesquioxane (octa-POSS) and amine-terminated PEG in existence with bis(trifluoromethane)sulfonamide lithium (LiTFSI, EO/Li⁺=16) as shown in FIG. 1B.

Figure 1C:
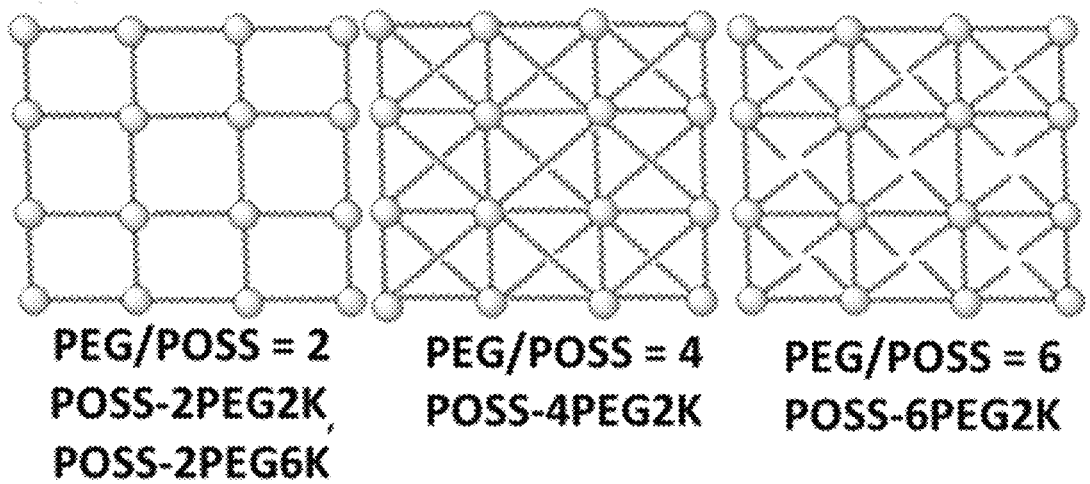

All materials were dissolved in tetrahydrofuran (THF), and then casted on glass plates. The thin films of the cross-linked PEG-POSS SPEs were obtained after curing at 90° C. for 12 hours, and then at 120° C. for 2 hours under vacuum. The octa-POSS allows us to tune the network structures in a large scale by changing the PEG polymer molecular weight and/or molar ratio of octa-POSS to PEG. In this work, four types of hybrid SPEs, abbreviated as POSS-nPEGm, were synthesized, and their compositions and characteristics are summarized in Table 1. Here n denotes the molar ratio between octa-POSS and PEG, and m is the molecular weight of each PEG chain. To qualitatively show the differences among these network structures, the ideal structure of each is depicted in FIG. 1C. For the SPE with n=2, each amine group reacts with two epoxy groups to form the network, in which each POSS particle is linked to four PEG chains while all the PEG chain ends are covalently bonded to POSS. Increasing n to 4, the number of branches on each POSS increases to 8. Further increasing n to 6, there is still eight branches on each POSS; however, four of them have free chain ends. We anticipate that the differences in network architectures will lead to SPEs with various mechanical and ionic conducting properties.

TABLE 1

Composition, Thermal Behavior, Modulus, and Ionic Conductivity of POSS-PEG Cross-Linked SPEs

| SPEs[a] | Molar Ratio (POSS:PEG) | $M_{n,\,PEG}$ (g/mol) | wt % POSS[b] | $T_g$ (° C.) | $T_m$ (° C.) | G' (MPa) at 90° C. | σ (S/cm) at 30° C. | $T_{Li+}$ |
|---|---|---|---|---|---|---|---|---|
| POSS-6PEG2K | 1:6 | 2000 | 5.6 | −45.5 | 22.8 | 6.3 | $9.5 \times 10^{-5}$ | 0.25 |
| POSS-4PEG2K | 1:4 | 2000 | 8.0 | −44.5 | —[c] | 33.6 | $4.4 \times 10^{-5}$ | 0.25 |
| POSS-2PEG2K | 1:2 | 2000 | 13.8 | −42.7 | —[c] | 38.5 | $1.3 \times 10^{-5}$ | 0.14 |
| POSS-2PEG6K | 1:2 | 6000 | 5.4 | −37.8 | 36.2 | 10.0 | $2.1 \times 10^{-5}$ | 0.24 |

[a]All samples had LiTFSI, EO/Li$^+$ = 16;
[b]weight percentage of $Si_{16}O_{20}C_{16}H_{48}$ in the SPEs;
[c]not detected.

FTIR was used to characterize the chemical structures of the cross-linked SPEs. The characteristic epoxy band at 910 cm$^{-1}$ disappears after cross-linking, indicating that most of the epoxy groups have reacted upon forming the network structures. DSC experiments were conducted to study the phase behaviors of the hybrid SPEs, which are highly dependent on the network structures (Table 1). The PEG2K and PEG6K have melting temperatures of 49° C. and around 60° C., respectively. However, in the DSC curves of POSS-2PEG2K and POSS-4PEG2K, only glass transitions at −42.7° C. and −44.5° C. can be detected. PEG crystallization is completely suppressed in both SPEs, suggesting that most of the PEG chain ends are covalently linked to POSS, and therefore their network structures are close to the ideal structures shown in FIG. 1C. When longer PEG chains are used, or free chain ends are introduced in the networks, as in the case of POSS-2PEG6K and POSS-6PEG2K, PEG crystallization can be observed with the melting temperatures of 36.2° C. and 22.8° C., relatively lower compared to PEG2K and PEG6K homopolymers, respectively. Considering that most of the epoxy groups have reacted, the network structure of POSS-2PEG6K is also close to the ideal one shown in FIG. 1C, while POSS-6PEG2K network may vary due to the excess amount of amine groups in the system.

Figure 2A:
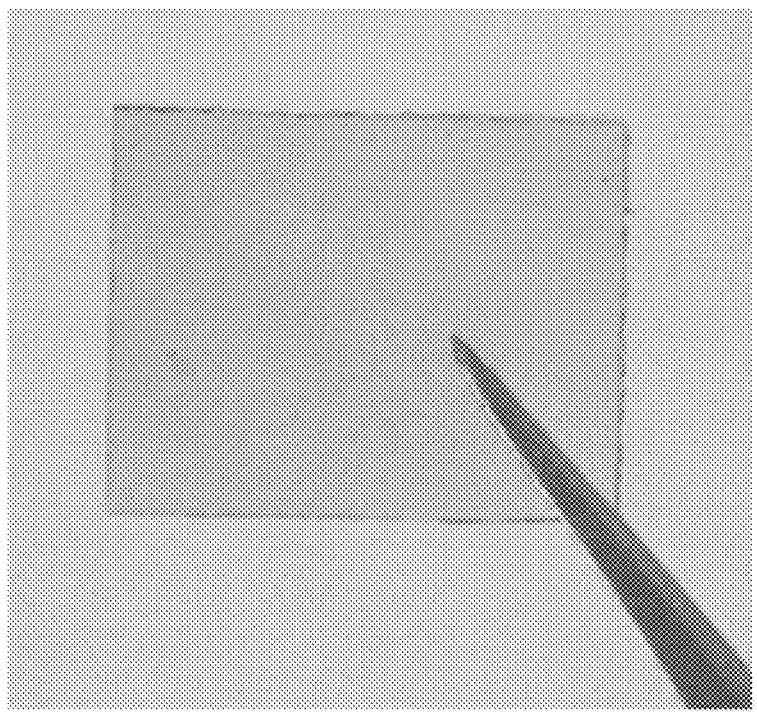
FIG. 2A is a photograph of a 250 μm thick film of POSS-2PEG2K.
Figure 2B:
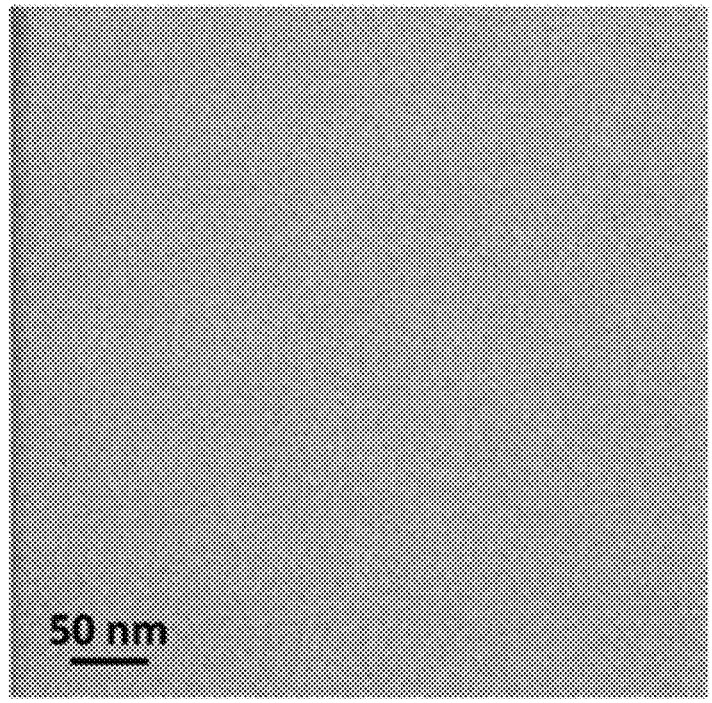
FIG. 2B is the STEM image of the film of FIG. 2A.
Figure 2C:
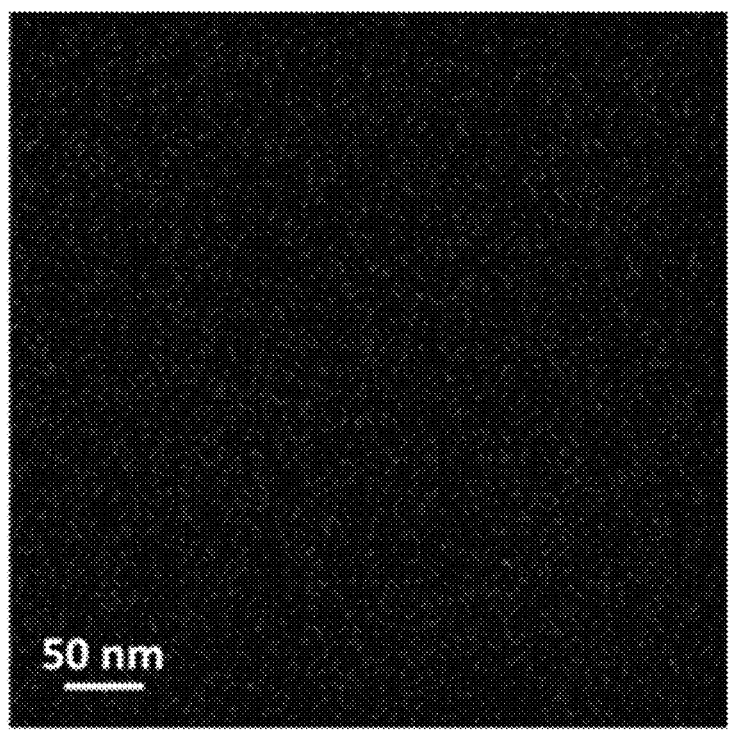
FIG. 2C is the STEM-EDS of Si. The storage modulus G' is shown in FIG. 2D and ionic conductivity of the POSS-PEG solid polymer electrolytes is shown in FIG. 2E, both as functions of temperature. The solid lines in FIG. 2E are the VTF fits. Ionic conductivity of MPEG2000/LiTFSI is from Refs. 38 and 39.

FIG. 2A shows a photograph of a robust film of POSS-2PEG2K. Aggregation of nanoparticles were observed in the diblock PS-b-PEO (SEO)/POSS-PEO electrolytes when increasing the content of POSS-PEO.[37] In the present case, the SPE POSS-2PEG2K with 13.8% of POSS was ultramicrotomed and imaged using scanning transmission electron microscopy (STEM). The STEM image in FIG. 2B shows particle aggregation; and the corresponding EDS compositional mapping of Si (FIG. 2C) shows uniform distribution of POSS in the SPE. Furthermore, small-angle X-ray scattering (SAXS) experiments were conducted; no scattering peak can be detected for the cross-linked SPEs with PEG2K, while POSS-2PEG6K shows very weak scattering at q=0.3 nm$^{-1}$. This scattering peak disappears when the sample was annealed at 100° C. for 20 min, suggesting that the weak scattering peak is due to the crystallization of PEG6K, which is consistent with wide-angle X-ray diffraction (WAXD) experiments. Combining these results and SEM images, we can conclude that a uniform dispersion of nanoparticles was achieved in the SPEs.

Figure 2D:
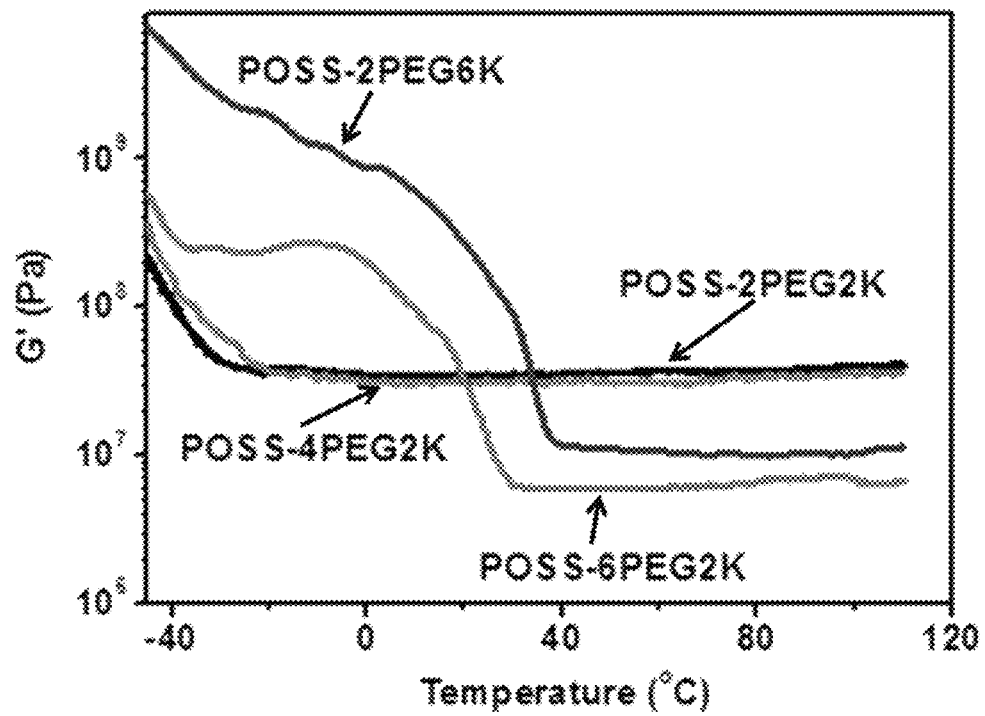
Figure 2E:
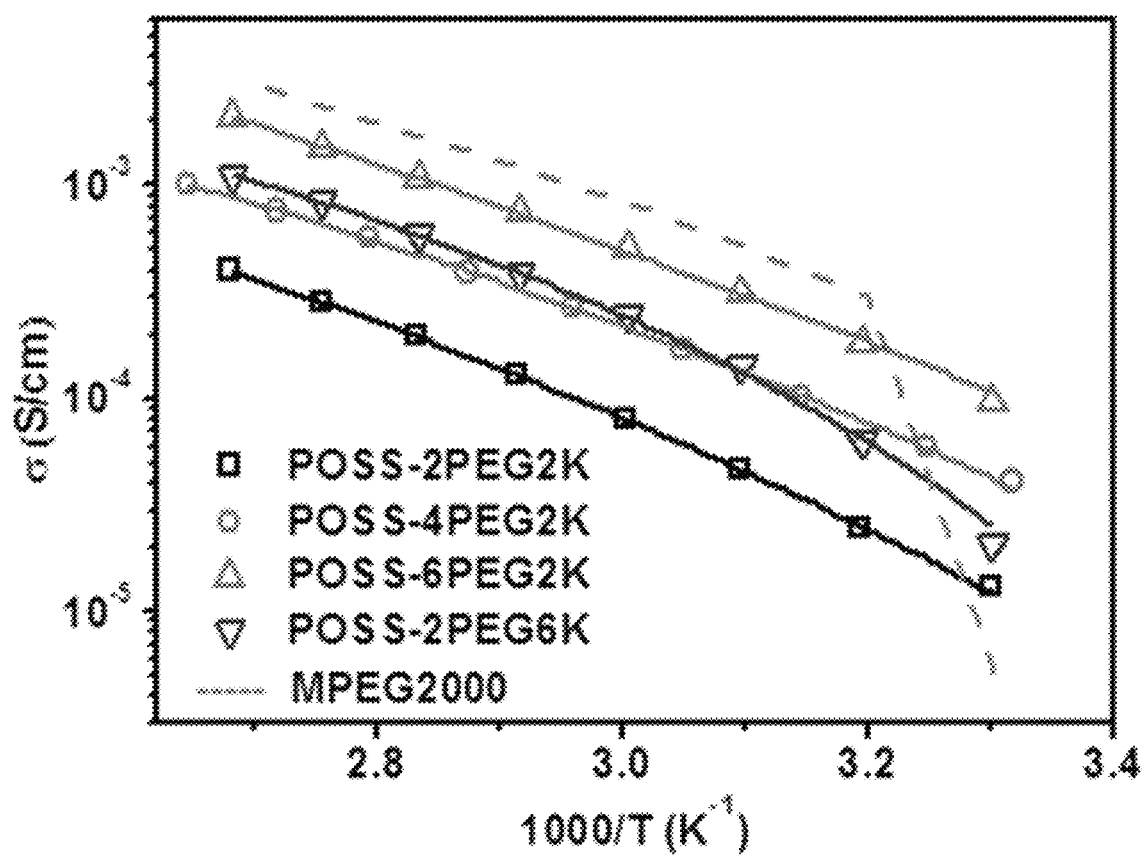

The mechanical properties of the cross-linked SPEs were measured by dynamic mechanical analysis (DMA) using a three-point bending mode, and the results are shown in FIG. 2D and Table 1. Because of the lack of crystallization, after glass transition, POSS-2PEG2K and POSS-4PEG2K show nearly constant storage moduli of 38.5 MPa and 33.6 MPa, respectively; these values are similar to those of SEO electrolytes at 90° C.[20] In the case of POSS-6PEG2K and POSS-2PEG6K above their melting temperature at around 40° C., the storage moduli decrease to a plateau value of 6.3 MPa and 10.0 MPa, respectively. The ionic conductivity of the hybrid SPEs also depends on their network structures. FIG. 2E shows the temperature-dependent ionic conductivity of the four SPEs during second heating. Solid lines in the figure are the best fit using the Vogel-Tammann-Fulcher (VTF) equation. Data of the poly(ethylene glycol) methyl ether (MPEG, $M_n$=2000) doped with LiTFSI from literatures[38, 39] are also included for comparison. For a given PEG chain length (2 kg/mol), the ionic conductivity of the cross-linked SPEs increases from $1.3 \times 10^{-5}$ (POSS-2PEG2K), to $4.4 \times 10^{-5}$ (POSS-4PEG2K), to $9.5 \times 10^{-5}$ S/cm (POSS-6PEG2K) at 30° C., which can be attributed to the increased PEG contents and segmental motion (decreased $T_g$) as we increase the octa-POSS/PEG molar ratio (Table 1). For the network structure with the same octa-POSS/PEG molar ratio (POSS-2PEG2K and POSS-2PEG6K), the conductivity increases with increasing PEG chain length, which can be attributed to higher volume fraction of PEG and a larger chain motion range associated with the longer chain length. Although the MPEG2000 shows higher ionic conductivity above its melting temperature, the cross-linked SPEs have much higher conductivity at low temperature. Notably, POSS-6PEG2K shows conductivity values of $9.5 \times 10^{-5}$ S/cm at 30° C. and $1.5 \times 10^{-3}$ S/cm at 90° C., both of which are comparable to the best reported values in cross-linked SPEs and hybrid SPEs.[22, 23, 30-36] POSS-4PEG2K shows a high ionic conductivity value (>1 mS/cm) and a high storage modulus (33.6 MPa) at 105° C., which are higher than those of the SEO electrolytes.[20] The observed high conductivity and modulus values in the cross-linked SPEs can be attributed to the suppression of crystallization and uniform hybrid network structures, as evidenced by DSC, DMA and XRD experiments. All cross-linked SPEs show typical lithium ion transference numbers (Table 1). Stable Li/SPE interface and typical electrochemical stability (0-4.1 V) have also been obtained.

Figure 3A:
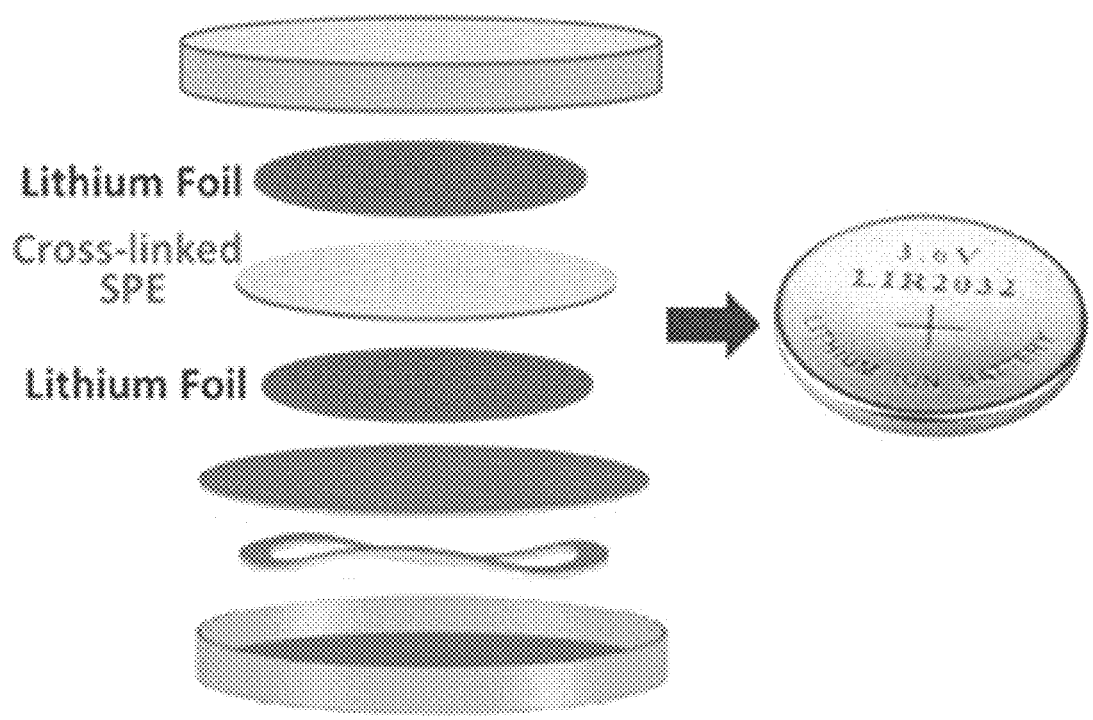
FIG. 3A shows the configuration of the lithium symmetric cell. Galvanostatic cycling curves of the cells with POSS- 4PEG2K as separators at current densities of 0.3 mA/cm² (FIG. 3B), 0.5 mA/cm² (FIG. 3C), and 1.0 mA/cm² (FIG. 3D). Charge passed the lithium symmetric cell ($C_d$) in the galvanostatic cycling tests at different current densities as shown in FIG. 3E. The measurements were conducted at 90° C. Note that the cell was still stable after 2600 hours cycling ($C_d$>2808 C/cm²) at J=0.3 mA/cm² for POSS-4PEG2K.
Figure 3B:
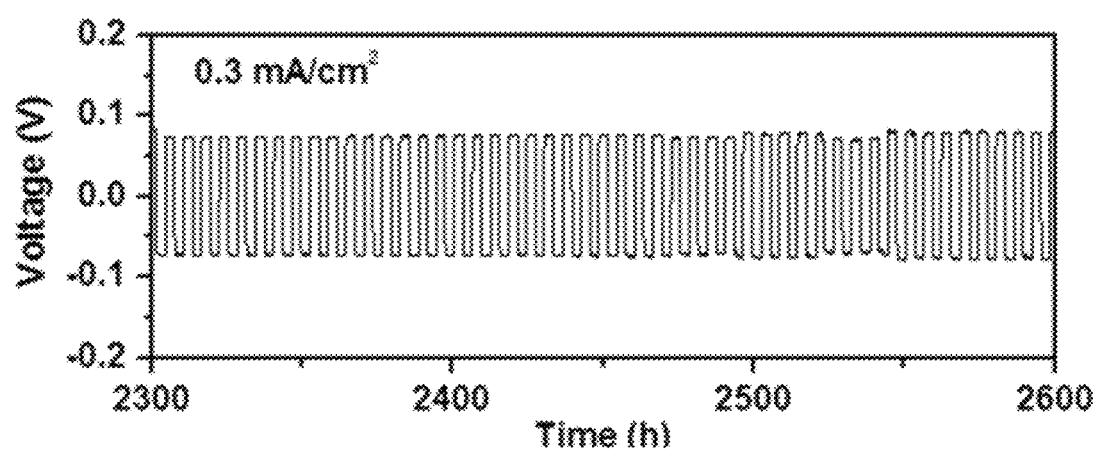
Figure 3C:
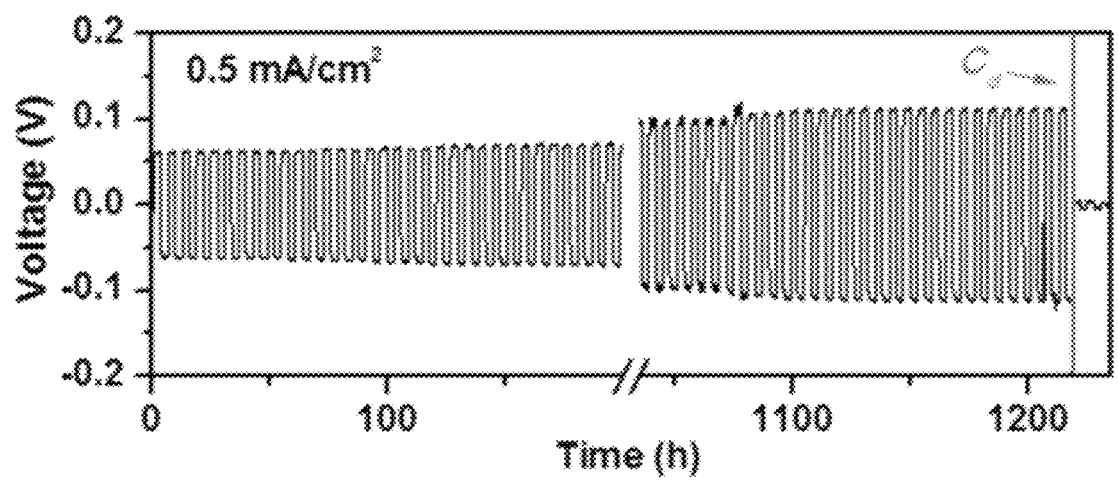
Figure 3D:
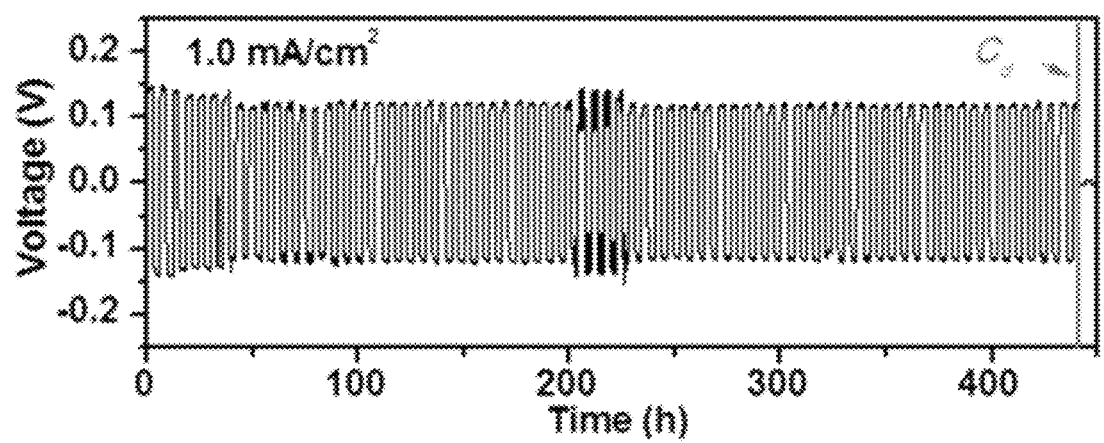
Figure 3E:
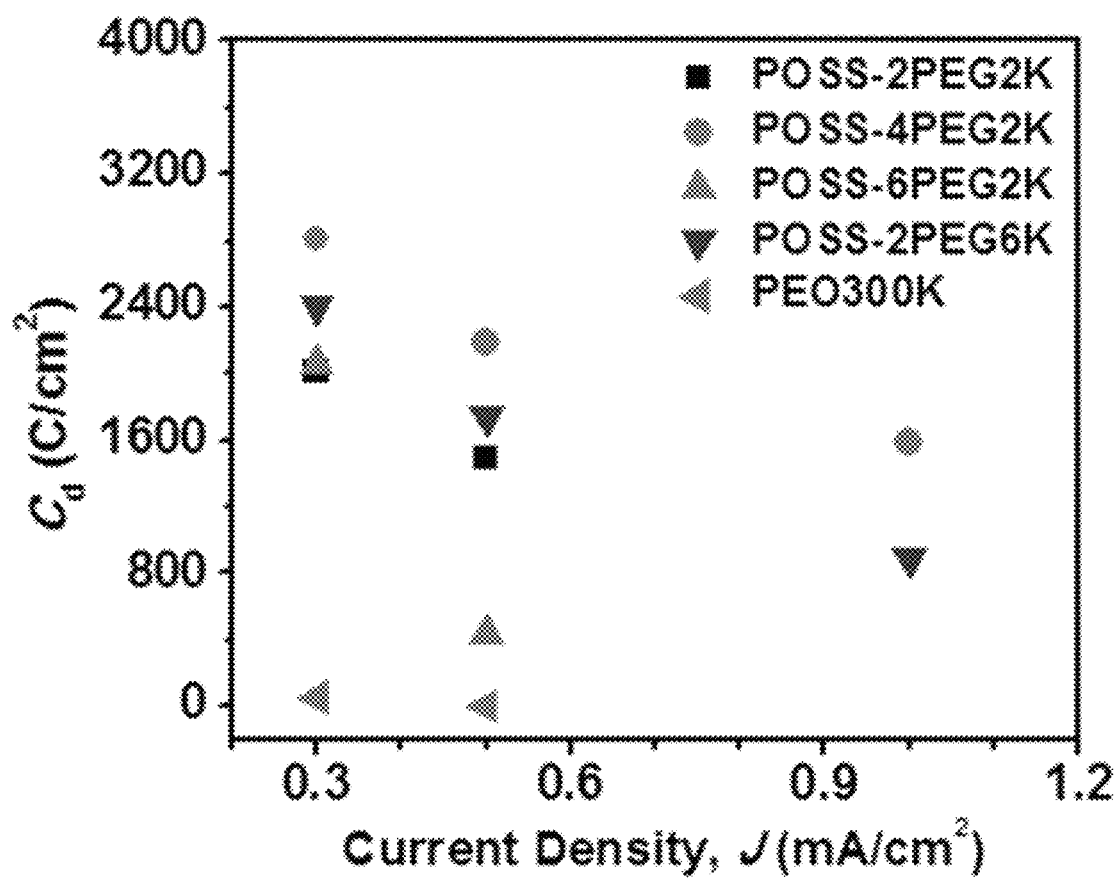

To study the electrodeposition of lithium in the cross-linked SPEs, galvanostatic cycling experiments of Li|crosslinked SPE|Li symmetric cells (FIG. 3A) were conducted at 90° C., in which three-hour charge and three-hour discharge cycling at specific current density was designed to mimic the lithium strip/plating process. Typical galvanostatic cycling curves of the lithium symmetric cells obtained for POSS-4PEG2K are shown in FIGS. 3B-3D. In these experiments, the current density is fixed, while the voltage of the cell is open, which becomes stable when stable Li/SPE interface is formed. However, the surface of the lithium foil becomes rougher after long-time plating/distriping, leading to slightly increase of the voltage due to the contact of the lithium and the SPEs. All cells were cycled until a sudden and substantial drop in voltage (greater than 50%) was observed. The charge passed the cell before short-circuit ($C_d$ values) was recorded as shown in FIG. 3E. PEO/LiTFSI was used as the control sample, which has $C_d$ of 54 and 4.3 C/cm$^2$ at J=0.3 and 0.5 mA/cm$^2$, respectively. The four cross-linked SPEs in our study show far greater $C_d$ compared with the PEO control sample, with POSS-4PEG2K clearly outperforms the other three. The Li|POSS-4PEG2K|Li symmetric cells are still stable after 2600 hours cycling ($C_d$>2808 C/cm$^2$) at J=0.3 mA/cm$^2$ (FIG. 3B), which is more than 50-fold of the PEO control sample. Remarkably, even under harsh electrochemical conditions at J=0.5 and 1.0 mA/cm$^2$, it displays $C_d$ values of 2182 ($t_d$=1212 h, FIG. 3C) and 1587 C/cm$^2$ ($t_d$=441 h, FIG. 3D) respectively. To the best of our knowledge, these values are higher than previous reported lithium symmetric cells used SPEs[19, 20, 22] liquid electrolytes,[12-15, 40, 41] or polymer gel electrolytes.[42] The symmetric cells with POSS-2PEG6K as separators also show relatively high $C_d$ values.

Monroe and Newman proposed that lithium dendrite resistance of the separators is corresponding to their shear modulus.[10] The TiO$_2$/SEO hybrid electrolyte (24 μm thick) with G'=43 MPa at 90° C. does show a high $C_d$ of 1766 C/cm$^2$ at J=0.17 mA/cm2.[19] However, the performance of SPEs with high modulus under high current densities was not reported. Here our results first demonstrate that high-modulus SPEs show excellent resistance to lithium dendrite growth under the aforementioned harsh electrochemical conditions. In addition to the mechanical properties, we believe that the network structure of the SPE is crucial to inhibiting lithium dendrite growth. The uniform cross-linked structures with nanometer mesh sizes allow the migration of lithium ion, but constrain the mobility of lithium clusters and lithium dendrites.[22, 40, 42] Among the four hybrid SPEs reported in this work, the high modulus POSS-4PEG2K has the densest PEG networks as shown in FIG. 1C, and exhibits the best ability to prevent the growth of lithium dendrites.

Figure 4A:
FIG. 4A shows the geometry of the Li/LiFePO₄ full battery with POSS-2PEG6K as the electrolyte.
Figure 4B:
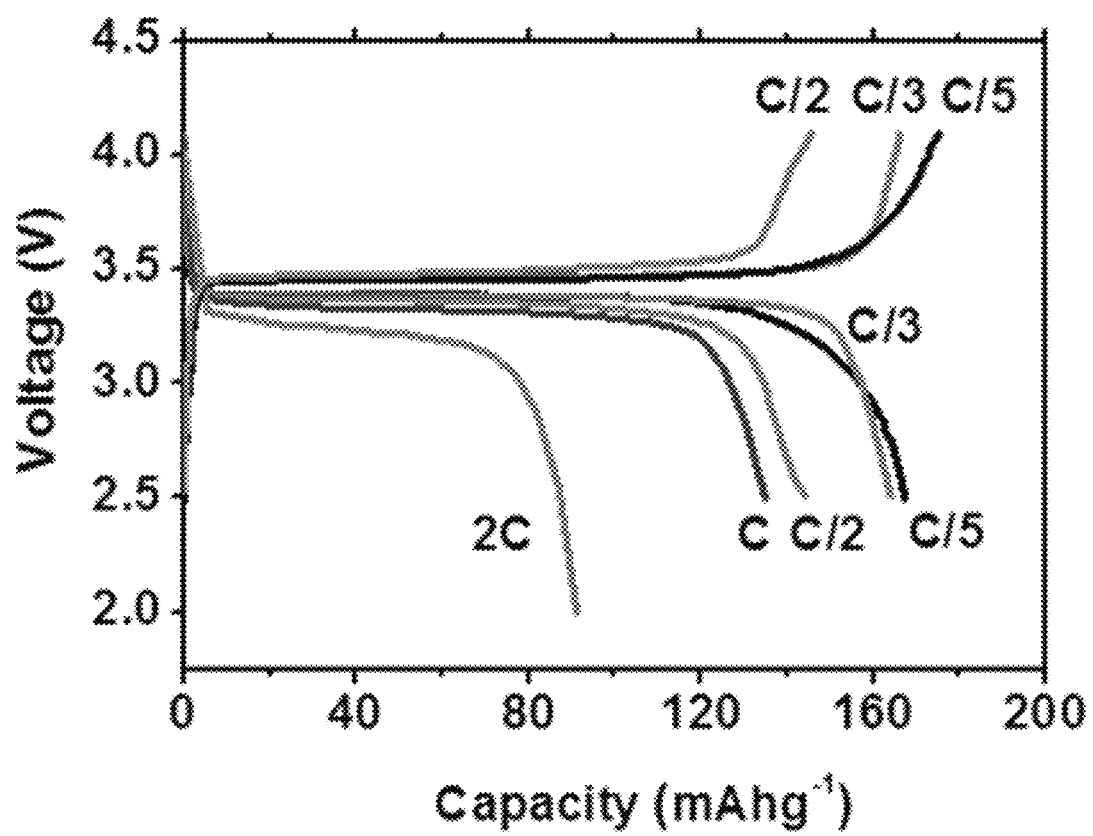
FIG. 4B shows the charge and discharge profiles of the batteries at different rates.
Figure 4C:
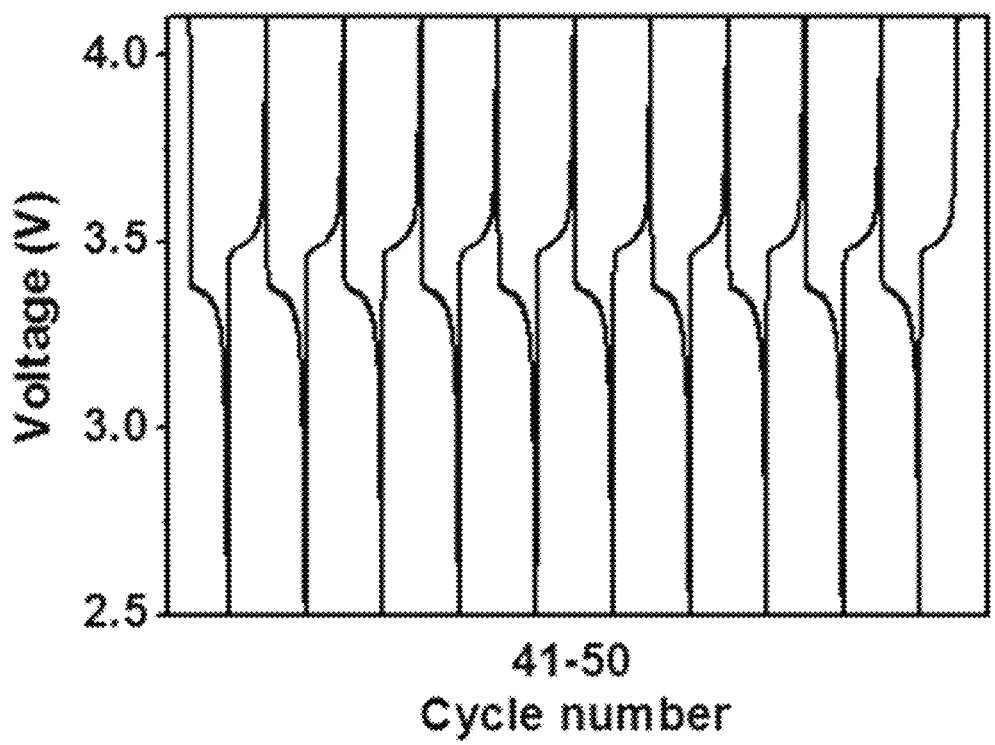
FIG. 4C shows the voltage vs. time profile for 41-50 galvanostatic cycles of the LMB at a C/2 rate.
Figure 4D:
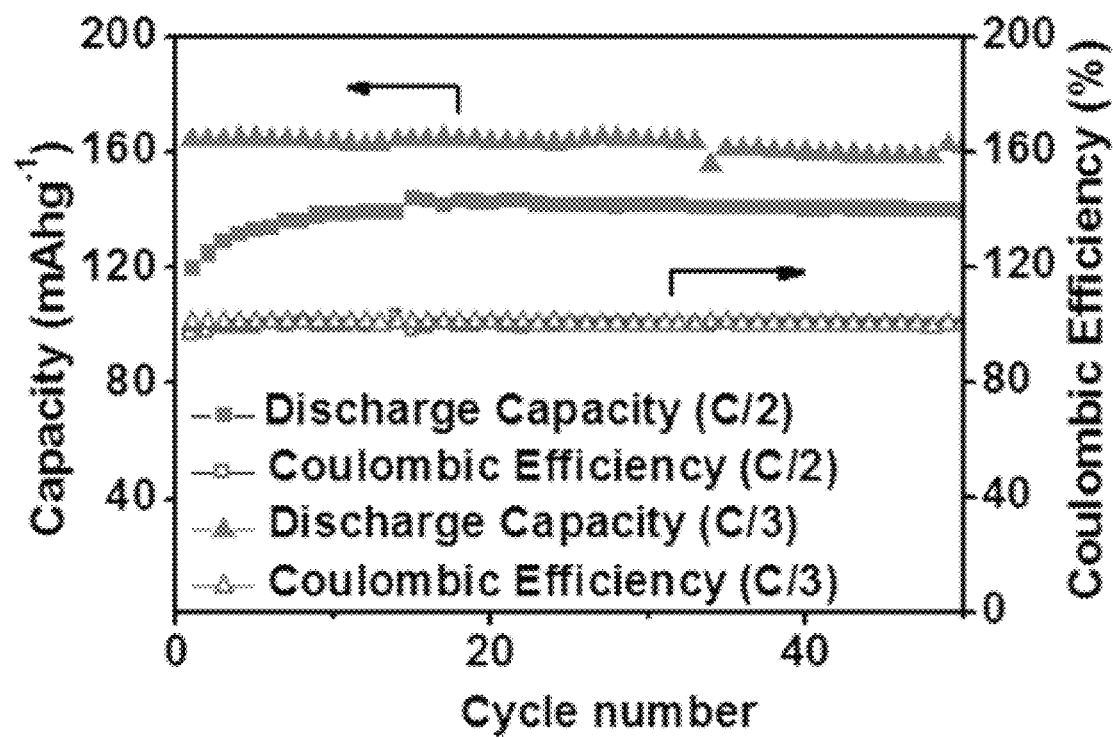
FIG. 4D shows the capacity and columbic efficiency vs. cycle number of the LMBs during galvanostatic cycling at C/2 and C/3 rates. The measurements were conducted at 90° C.

To confirm the usefulness of the POSS-PEG cross-linked SPEs, POSS-2PEG6K, which has moderate conductivity and mechanical properties in the four samples, was used as the separator to assemble the all-solid-state Li/LiFePO$_4$ battery reported here; the cell geometry is shown in FIG. 4A. The composite cathode used in our study is comprised of 60 wt % LiFePO$_4$, 32 wt % POSS-2PEG6K and 8 wt % of ethylene carbon. Thickness of the cathode and the electrolyte membrane are approximately 30 and 150 μm, respectively. The batteries were cycled at 90° C. with different rates where C/x means a charge/discharge of the theoretical cathode capacity (C) in x hours. The evolution of the battery voltage at different charge/discharge rates is shown in FIG. 4B. A well-defined potential plateau was observed up to a 2 C discharge rate. Charge/discharge capacity (above 160 mAhg$^{-1}$) close to the theoretical value of 170 mAhg$^{-1}$ for LiFePO$_4$ was delivered at C/5 and C/3, while the discharge capacity decreased to 144 and 135 mAhg$^{-1}$ when increasing the rate to C/2 and 1 C, respectively. Compared to other studies, most all-solid-state Li/LiFePO$_4$ batteries only obtain at most a capacity of 140 mAhg$^{-1}$ in the galvanostatic cycling.[36, 43, 44] The discharge capacities of the state-of-the-art ones using single ion triblock copolymers as electrolytes can reach the value above 160 mAhg$^{-1}$ with a C/15 charge rate; however, it decreases to 120 mAhg$^{-1}$ when the battery is charged with a C/4 rate.[21] Obviously, our LMBs show enhanced rate capability. FIG. 4C is the voltage profile of the 41-50 galvanostatic cycles at C/2, which shows constant capacity delivered at each cycle. When galvanostatically cycled at C/2 or C/3 for 50 cycles, the batteries show no capacity decay and high coulombic efficiency (>99%), except for the first three cycles, FIG. 4D). The high ionic conductivity and excellent resistance to lithium dendrites growth of the electrolyte account for the excellent stability of the batteries.

In summary, a new class of hybrid electrolytes based on POSS with controlled network structures have been designed and prepared using a facile one-pot reaction. Properties of the SPEs including conductivity, mechanical properties and resistance to lithium dendrites growth can be tuned by changing the cross-linked structures. SPEs with high room temperature ion conductivity (≈0.1 mS/cm) or with high ionic conductivity (>1 mS/cm) combined with high storage modulus (33.6 MPa) at 105° C. have been obtained. The latter one shows superior resistance to lithium dendrites growth compared with reported SPE systems, even under high current densities of 0.5 mA/cm$^2$ and 1.0 mA/cm$^2$. Li/LiFePO$_4$ batteries using POSS-2PEG6K as the electrolyte show improved cycling stability and rate capability. The reported hybrid SPEs therefore are promising for fabricating next generation safe LMBs. The structure of the POSS may be as follows:

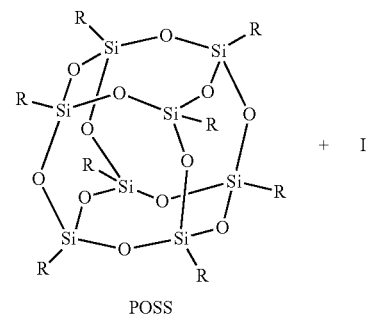

POSS

The R group(s) on the surface of the POSS may include any functional group that is cross-linkable to provide a network structure similar to any of the structures shown above in FIG. 1. The R groups may be selected from hydrogen, hydrocarbyl, reactive functional groups and functionalized hydrocarbyl groups. The POSS could have 3-8 R groups selected from the reactive functional groups and functionalized hydrocarbyl groups. Each of the POSS materials disclosed in the references cited herein may be employed in the present invention to provide the network structure. To this end, other particles in addition to POSS might be useful if such particles function as both a nanoparticle and a crosslinker to provide the required network structure.

Some examples of POSS that may be used in the present invention include these with an epoxy group at a distal end of one or more of the R groups. These compounds can be represented by the following formula:

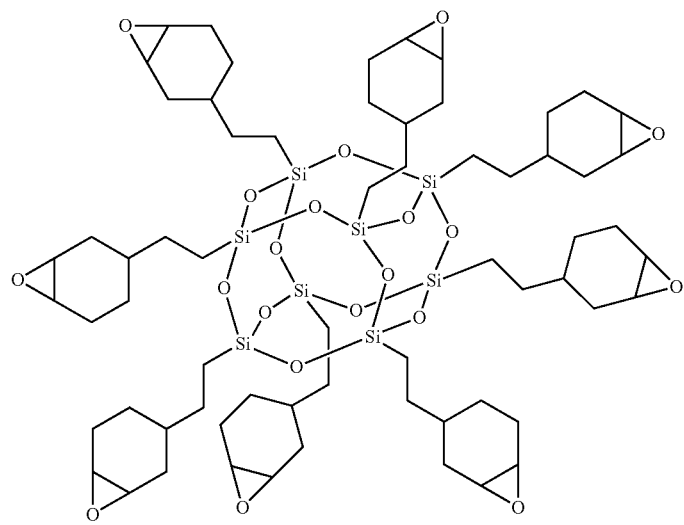
epoxycyclohexylethyl polysilsesquioxane
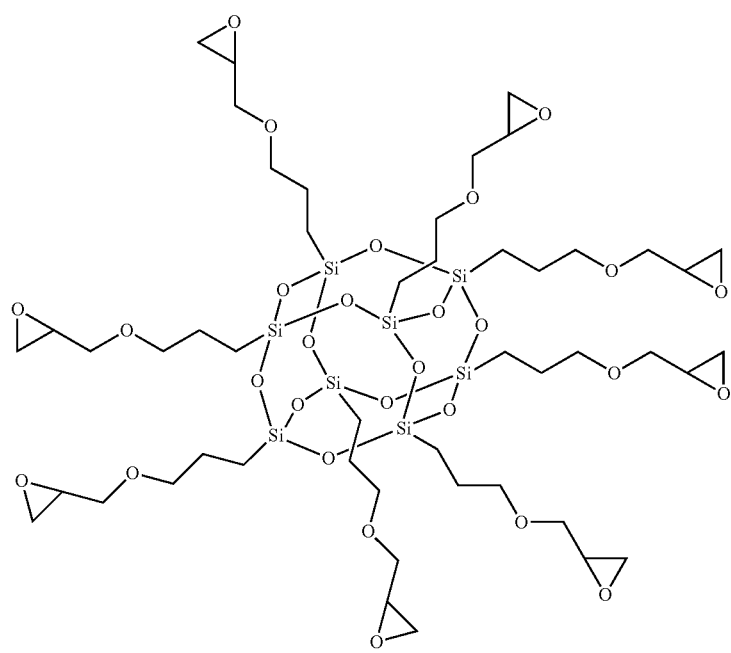
glycidyl POSS

-continued

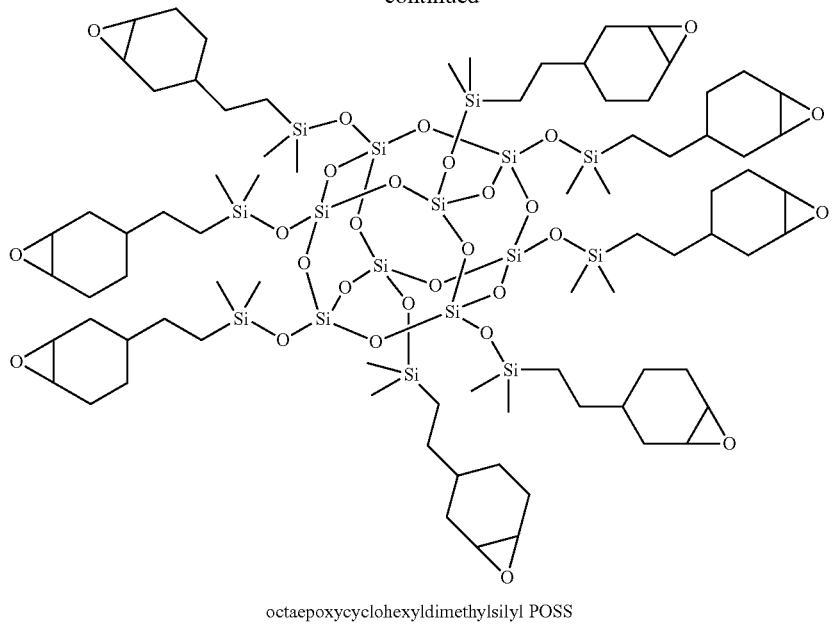

octaepoxycyclohexyldimethylsilyl POSS

Though many examples of POSS discussed herein have eight R groups each comprising a reactive functional group or a functionalized hydrocarbyl group, POSS molecules with only some of the R groups comprising a functionalized group suitable for a cross-linking reaction may be used. For example, POSS with 1 to 7 R groups each comprising a reactive functional group or a functionalized hydrocarbyl group may be suitable for the present invention. In some embodiments, the number of R groups in a POSS that comprise a reactive functional group or a functionalized hydrocarbyl group may be from 1 to 6, or from 2 to 6, or from 3 to 6, or from 1-2.

In this case, the POSS will not be the crosslinking point, but instead is covalently and uniformly incorporated in the network structure to provide a high performance SPE. PEG chains with different molecular weights can be used. The molecular weight (Mn) of the PEG chain can be as low as about 250 g/mol and as high as 300,000 g/mol or higher. Preferably, the molecular weight is from about 1,000-10,000 g/mol.

In some embodiments, the amine-terminated PEG may have a molecular weight in the range of from about 2 k Dalton to about 6 k Dalton. In some other embodiments, the amine-terminated PEG may have a molecular weight less than about 2 k Dalton. In yet some other embodiments, the amine-terminated PEG may have a molecular weight more than about 6 k Dalton.

In some embodiments, the amine-terminated PEG may be replaced with another functionalized polymer selected from hydroxyl-terminated PEG, amine-terminated poly(ethyl oxide) (PEO) and hydroxy-terminated poly(ethyl oxide) (PEO).

The present invention can be applied to any lithium or sodium salt that is known for use in batteries. As shown in FIG. 1B, for example, a lithium salt such as bis(trifluoromethane) sulfonamide lithium, may be present during the reaction of POSS and amine-terminated PEG, hydroxyl-terminated PEG, amine-terminated PEO or hydroxy-terminated PEO to form cross-linked PEG/PEO-POSS SPEs. Other lithium salts that may also be used in the present invention include hexafluoroarsenate; hexfluorophosphate; perchlorate; tetrafluoroborate; tris(pentafluoroethyl)trifluorophosphate; trifluoromethanesulfonate; bis(fluorosulfonyl) imide; cyclo-difluoromethane-1,1-bis(sulfonyl)imide; cyclo-hexafluoropropane-1,1-bis(sulfonyl)imide; bis(perfluoroethyanesulfonyl)imide; bis(oxalate)borate; difluoro (oxalato)borate; dicyanotriazolate; tetracyanoborate; dicyanotriazolate; dicyano-trifluoromethyl-imidazole; and dicyano-pentafluoroethyl-imidazole.

The molar ratio of POSS to functionalized polymer (such as amine terminated PEG) for producing cross-linked SPEs of the present invention may vary from 1:100 to 10:1 or from 1:20 to 1:1 or from 1:6 to 1:2, or 1:7 to 1:1.

The above-mentioned network may optionally be blended with low molecular weight (Mn) PEG, having a molecular weight of less than 2,000 g/mol, such as PEG 250, to improve the conductivity, and optionally the cycling stability.

The products of the forgoing process are also within the scope of the present invention, as are batteries including such products.

EXPERIMENTAL SECTION

Materials

Octakis(3-glycidyloxypropyldimethylsiloxy) octa silsesquioxane (octa-POSS), poly(ethylene glycol) bis(3-aminopropyl) terminated ($M_y$ =2000 g/mol, confirmed by NMR), poly(ethylene glycol)diamine ($M_y$ =6000 g/mol), bis(trifluoromethane)sulfonamide lithium salt (LiTFSI), and tetrahydrofuran were purchased from Aldrich and used as received. Lithium foil was offered by Alfa Aesar. LiFePO$_4$ and ethylene carbon were obtained from MTI Corporation.

Preparation of POSS-2PEG2K

Octa-POSS (80.6 mg), poly(ethylene glycol) bis(3-aminopropyl) terminated ($M$, =2000 g/mol, 161.1 mg), and LiTFSI (62.7 mg) were dissolved in 1.0 mL THF and reacted at 60° C. for three hours. The solution was then casted onto a glass plate. After most of the THF evaporated at room temperature in two hours, the sample was put in the vacuum oven to cure at 90° C. for 12 hours. Then the vacuum oven was heated to 120° C. for 2 hours to make sure all the epoxy groups were reacted. After cooling to room temperature under vacuum, the sample was transferred to an argon-filled glove box.

POSS-4PEG2K, POSS-6PEG2K, and POSS-2PEG6K were prepared following a similar procedure.

Measurements

Scanning transmission electron microscopy (STEM) experiments were performed on a JEOL JEM2100, equipped with a bright-field STEM detector and imaging system. Samples were microtomed into 100-175 nm sections using a Leica UC6 ultramicrotome and picked up on a lacey carbon coated copper grid. Dynamic mechanical analysis (DMA) was carried out using a Perkin-Elmer dynamic mechanical analyzer (DMA7) in a three-point bending mode with a heating rate of 2° C./min and frequency of 1 Hz. The sample length, width, and height were 10, 4, and 1 mm, respectively. Electrochemical measurements were performed in an argon-purged glove box using a Princeton Applied Research Parstat 2273 Potentiostat, with POWER-SUITE software.

Galvanostatic cycling measurements were performed on SPE|Li symmetric coin cells (2032 type) with a MACCOR battery tester at 90° C. The diameter of the lithium foil was 8 mm. The thickness of the hybrid cross-linked polymer electrolytes was 250±50 μm. The thickness of the PEO300K control samples was 300 μm. Coin cells were assembled in an argon-filled MBraun glove box ($H_2O$<0.1 ppm), and were kept at 90° C. for an hour before testing. Repeated three-hour charge and three-hour discharge cycles were performed for the galvanostatic cycling measurements until a sudden and substantial drop in voltage (more than 50%) was observed. Three measurements were carried out for POSS-4PEG2K at J=0.5 $mA/cm^2$. Short-circuit times of 1212 h, 1562 h and 1664 h were obtained. The lowest value was used in the paper. Since the cycling tests were time-consuming, only one measurement for other samples was performed.

$LiFePO_4$ was selected as the active material of the cathode in the lithium metal battery test. A composition of 60/32/8 (wt %) of $LiFePO_4$/POSS-2PEG6K/$C_{65}$ was used. POSS, PEG6K, and LiTFSI were dissolved in small amount of THF and reacted at 60° C. for 3 hours before mixing with other components in distilled water. The slurry obtained was cast onto a clean stainless steel sheet. Further curing and drying were done by keeping the cathode in a vacuum oven at 110° C. for 12 h. Li/POSS-2PEG6k/$LiFePO_4$ coin-cell batteries were assembled through a lamination processes. The thickness of the cathode and POSS-2PEG6K was approximately 30 μm and 150 μm, respectively. Current rate was determined by using the theoretical capacity of 170 $mAhg^{-1}$ for Li/$LiFePO_4$ cell. The potential window was 4.1 V to 2.5 V for regimes below C; the lower potential limit decreased to 2V at 2 C. The galvanostatic cycling was used for regimes below C/2, while charge rate for C and 2 C is C/3 to make sure it was fully charged.

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

All documents mentioned herein are hereby incorporated by reference in their entirety or alternatively to provide the disclosure for which they were specifically relied upon.

The foregoing embodiments are susceptible to considerable variation in practice. Accordingly, the embodiments are not intended to be limited to the specific exemplifications set forth herein. Rather, the foregoing embodiments are within the spirit and scope of the appended claims, including the equivalents thereof available as a matter of law.

The applicant(s) do not intend to dedicate any disclosed embodiments to the public, and to the extent any disclosed modifications or alterations may not literally fall within the scope of the claims, they are considered to be part hereof under the doctrine of equivalents.

REFERENCES

[1] C. X. Zu, H. Li, *Energy Environ. Sci.* 2011, 4, 2614.
[2] L. Grande, E. Paillard, J. Hassoun, J. B. Park, Y. J. Lee, Y. K. Sun, S. Passerini, B. Scrosati, *Adv. Mater* 2015, 27, 784.
[3] P. G Bruce, S. A. Freunberger, L. J. Hardwick, J. M. Tarascon, *Nat. Mater* 2012, 11, 19.
[4] M. Jacoby, *Chem. Eng. News* 2013, 91, 33.
[5] C. Brissot, M. Rosso, J. N. Chazalviel, S. Lascaud, *J. Power Sources* 1999, 81-82, 925.
[6] M. Rosso, C. Brissot, A. Teyssot, M. Dolle, L. Sannier, J.-M. Tarascon, R. Bouchet, S. Lascaud, *Electrochimica Acta.* 2006, 51, 5334.
[7] M. Dolle, L. Sannier, B. Beaudoin, M. Trentin, J.-M. Tarascon, *Electrochem. Solid-State Lett.* 2002, 5, A286.
[8] K. J. Harry, D. T. Hallinan, D. Y Parkinson, A. A. MacDowell, N. P. Balsara, *Nat. Mater.* 2014, 13, 69.
[9] J. N. Chazalviel, *Phys. Rev.* A 1990, 42, 7355.
[10] C. Monroe, J. Newman, *J. Electrochem. Soc.* 2005, 152, A396.
[11] R. Mogi, M. Inaba, S. K. Jeong, Y. Iriyama, T. Abe, Z. Ogumi, *J. Electrochem. Soc.* 2002, 149, A1578.
[12] Y. Y. Lu, Z. Y. Tu, L. A. Archer, *Nat. Mater* 2014, 13, 961.
[13] Y. Y. Lu, Z. Y. Tu, J. Shu, L. A. Archer, *J. Power Sources.* 2015, 279, 413.
[14] Y. Y. Lu, K. Korf, Y. Kambe, Z. Y Tu, L. A. Archer, *Angew. Chem. Int. Ed.* 2014, 53, 488.
[15] Y. Y. Lu, S. K. Das, S. S. Moganty, L. A. Archer, *Adv. Mater.* 2012, 24, 4430.
[16] J. S. Zhang, Y. Bai, X. G. Sun, Y C. Li, B. K. Guo, J. H. Chen, G M. Veih, D. K. Hensley, M. P. Paranthaman, J. B. Goodenough, S. Dai. *Nano lett.* 2015, 15, 3398.
[17] M. Ishikawa, M. Morita, Y. Matsuda, *J. Power Sources* 1997, 68, 501.
[18] M. Ishikawa, S. Yoshitake, M. Morita, Y Matsuda, *J. Electrochem. Soc.* 1994, 141, L159.
[19] Gurevitch, R. Buonsanti, A. A. Teran, B. Gludovatz, R. O. Ritchie, J. Cabana, N. P. Balsara, *J. Electrochem. Soc.* 2013, 160, A1611.
[20] G M. Stone, S. A. Mullin, A. A. Teran, D. T. Hallinan Jr., A. M. Minor, A. Hexemer, N. P. Balsara, *J. Electrochem. Soc.* 2012, 159, A222.
[21] R. Bouchet, S. Maria, R. Meziane, A. Aboulaich, L. Lienafa, J.-P. Bonnet, T. N. T. Phan, D. Bertin, D. Gigmes, D. Devaux, R. Denoyel, M. Armand, *Nat. Mater* 2013, 12, 452.
[22] R. Khurana, J. L. Schaefer, L. A. Archer, G W Coates, *J. Am. Chem. Soc.* 2014, 136, 7395.
[23] S. Liu, N. Imanishi, T. Zhang, A. Hirano, Y Takeda, O. Yamamoto, J. Yang, *J. Power Sources* 2010, 195, 6847.
[24] S. Liu, H. Wang, N. Imanishi, T. Zhang, A. Hirano, Y. Takeda, O. Yamamoto, J. Yang, *J. Power Source* 2011, 196, 7681.

[25] W Liu, N. Liu, J. Sun, P.-C. Hsu, Y Li, H.-W. Lee, and Y Cui, *Nano Letters* 2015, 15, 2740.

[26] H. Zhang, S. Kulkarni, S. L. Wunder, *J. Electrochem. Soc.* 2006, 153, A239-A248.

[27] M. W Schulze, L. D. McIntosh, M. A. Hillmyer, T. P. Lodge, *Nano Lett.* 2014, 14, 122.

[28] Smith, D. M.; Cheng, S; Wang, W D.; Bunning, T. J; Li, C. Y *J. Power Source* 2014, 271, 597.

[29] Smith, D. M.; Dong, B; Marron, R. W; Birnkrant, M. J.; Elabd, Y. A.; Natarajan, L. V.; Tondiglia, V. P.; Bunning, T. J.; Li, C. Y *Nano Lett* 2012, 12, 310.

[30] M. Watanabe, S. Nagano, K. Sanui, N. Ogata, *Polym. J.* 1986, 18, 808.

[31] Z. C. Zhang, D. Sherlock, R. West, R. West, K. Amine, L. J. Lyons, *Macromolecules* 2003, 36, 9176.

[32] C. N. Walker, C. Versek, M. Touminen, G N. Tew, *ACS Macro Lett.* 2012, 1, 737.

[33] X. G Sun, C. L. Reeder, J. B. Kerr, *Macromolecules,* 2004, 37, 2219.

[34] P. M. Blonsky, D. F. Shriver, *J. Am. Chem. Soc.* 1984, 106, 6854.

[35] F. Croce, G B. Appetecchi, L. Persi, B. Scrosati, *Nature* 1998, 394, 456.

[36] L. Damena, J. Hassounb, M. Mastragostinoa, B. Scrosatib, *J. Power Sources* 2010, 195, 6902.

[37] I. Villaluenga, X. Chen, D. Devaux, D. T. Hallinan, N. P. Balsara, *Macromolecules,* 2015, 48, 358.

[38] J. L. Nugent, S. S. Moganty, L. A. Archer, *Adv. Mater.* 2010, 22, 3677.

[39] D. Devaux, R. Bouchet, D. Gle, R. Denoyel, *Solid State Ionic* 2012, 227, 119.

[40] Z. Y. Tu, Y. Kambe, Y. Y. Lu, L. A. Archer, *Adv. Energy Mater.* 2014, 4, 1300654.

[41] Y. Y. Lu, M. Tikekar, R. Mohanty, K. Hendrickson, L. Ma, L. A. Archer, *Adv. Energy Mater* 2015, 4, 1402073.

[42] Q. W. Lu, J. Yang, W Lu, J. L. Wang, Y. Nuli, *Electrochimica Acta* 2015, 152, 489.

[43] F. Croce, S. Sacchetti, B. Scrosati, *J. Power Sources* 2006, 162, 685.

[44] L. S. Wang, X. W. Li, W. S. Yang, *Electrochimica Acta* 2010, 55 1895.

All references cited above are hereby incorporated by reference in their entirety.

The invention claimed is:

1. A process for making lithium or sodium solid polymer electrolytes comprising a step of reacting an inorganic polyhedral oligomeric silsesquioxane with end functional groups and a diterminal functionalized poly(ethylene glycol) or a diterminal functionalized poly(ethylene oxide) to form a chemically crosslinked network in the presence of a lithium or sodium salt or mixture of lithium and sodium salts.

2. The process of claim 1, wherein the polyhedral oligomeric silsesquioxane is reacted with an amine-terminated diterminal functionalized poly(ethylene glycol).

3. The process of claim 1 wherein the polyhedral oligomeric silsesquioxane is reacted with the diterminal functionalized poly(ethylene oxide).

4. A process as claimed in claim 1, wherein the inorganic polyhedral oligomeric silsesquioxane has the structure:

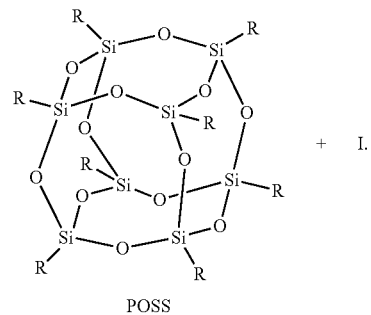

POSS wherein each R group is independently selected from hydrogen, hydrocarbyl, reactive functional groups and functionalized hydrocarbyl groups and at least one of the R groups contains a functional group suitable for a cross-linking reaction.

5. The process as claimed in claim 4, wherein at least one R group comprises an epoxy group.

6. The process as claimed in claim 4, wherein the inorganic polyhedral oligomeric silsesquioxane has eight R groups each of which comprises a functional group suitable for a cross-linking reaction selected from reactive functional groups and functionalized hydrocarbyl groups.

7. The process as claimed in claim 1, wherein the inorganic polyhedral oligomeric silsesquioxane is selected from octakis(3-glycidyloxypropyldimethylsiloxy)octasilsesquioxane, epoxycyclohexylethyl polysilsesquioxane, glycidyl polyhedral oligomeric silsesquioxane, and octa epoxycyclohexyldimethylsilyl polyhedral oligomeric silsesquioxane.

8. The process as claimed in claim 1, wherein the polyhedral oligomeric silsesquioxane is reacted with the diterminal functionalized poly(ethylene glycol) and a poly(ethylene glycol) chain in the diterminal functionalized poly (ethylene glycol) has a number average molecular weight of from about 250 g/mol to about 300,000 g/mol.

9. The process as claimed in claim 1, wherein the salt is the lithium salt with an anion selected from the group consisting of bis(trifluoromethane)sulfonamide, hexafluoroarsenate, hexfluorophosphate, perchlorate, tetrafluoroborate, tris(pentafluoroethyl)trifluorophosphate, trifluoromethanesulfonate, bis(fluorosulfonyl)imide, cyclo-difluoromethane-1,1-bis(sulfonyl)imide, cyclo-hexafluoropropane-1,1-bis (sulfonyl)imide, bis(perfluoroethyanesulfonyl)imide, bis (oxalate)borate, difluoro(oxalato)borate, dicyanotriazolate, tetracyanoborate, dicyanotriazolate, dicyano-trifluoromethyl-imidazole, and dicyano-pentafluoroethyl-imidazole.

10. The process as claimed in claim 1, wherein the molar ratio of moles of the polyhedral oligomeric silsesquioxane to moles of the diterminal functionalized poly(ethylene glycol) or moles of the diterminal functionalized poly(ethylene oxide) is from about 1:100 to about 10:1.

11. The process as claimed in claim 1, further comprising a step of blending with poly(ethylene glycol), having a number average molecular weight of less than 2,000 g/mol.

12. The process as claimed in claim 2, wherein the amine-terminated diterminal functionalized poly(ethylene glycol) has a molecular weight of from about 2,000 g/mol to about 6,000 g/mol.

13. The process as claimed in claim 1, wherein the polyhedral oligomeric silsesquioxane is reacted with the diterminal functionalized poly(ethylene oxide) and the diterminal functionalized poly(ethylene oxide) is amine-terminated.

14. A product made by the process of claim 1.

15. A battery comprising the product of claim 14.

16. The process as claimed in claim 1, wherein the polyhedral oligomeric silsesquioxane is reacted with the diterminal functionalized poly(ethylene oxide) and the diterminal functionalized poly(ethylene oxide) is hydroxyl-terminated.

17. The process as claimed in claim 1, wherein the polyhedral oligomeric silsesquioxane is reacted with the diterminal functionalized poly(ethylene glycol) and the diterminal functionalized poly(ethylene glycol) is amine-terminated.

18. The process as claimed in claim 1, wherein the molar ratio of moles of the polyhedral oligomeric silsesquioxane to moles of the diterminal functionalized poly(ethylene glycol) or moles of the diterminal functionalized poly(ethylene oxide) is from about 1:20 to about 1:1.

19. The process as claimed in claim 1, wherein the molar ratio of moles of the polyhedral oligomeric silsesquioxane to moles of the diterminal functionalized poly(ethylene glycol) or moles of the diterminal functionalized poly(ethylene oxide) is from about 1:6 to about 1:2.

20. The process as claimed in claim 1, wherein the polyhedral oligomeric silsesquioxane is reacted with the diterminal functionalized poly(ethylene glycol) and a poly(ethylene glycol) chain in the diterminal functionalized poly(ethylene glycol) has a number average molecular weight of from about 500-10,000 g/mol.

\* \* \* \* \*